United States Patent [19]
Pierotti et al.

[11] 4,321,799
[45] Mar. 30, 1982

[54] METHOD FOR UTILIZING GAS-SOLID DISPERSIONS IN THERMODYNAMIC CYCLES FOR POWER GENERATION AND REFRIGERATION

[75] Inventors: Robert A. Pierotti, Atlanta; Thomas R. Rybolt, Decatur, both of Ga.

[73] Assignee: Georgia Tech Research Institute, Atlanta, Ga.

[21] Appl. No.: 135,107

[22] Filed: Mar. 28, 1980

[51] Int. Cl.³ .................. F25B 15/00; C09K 5/00
[52] U.S. Cl. ............................ 62/112; 62/480; 252/69
[58] Field of Search ............ 62/112, 115, 480; 252/69

[56] References Cited
U.S. PATENT DOCUMENTS

| | | | |
|---|---|---|---|
| 2,185,040 | 12/1939 | Smith et al. | 62/112 |
| 3,397,549 | 8/1968 | Daunt | 62/79 |
| 3,704,600 | 12/1972 | Prost et al. | 62/457 |
| 3,854,301 | 12/1974 | Cytryn | 62/101 |
| 4,111,002 | 9/1978 | Hinderikus et al. | 62/467 |

*Primary Examiner*—William E. Wayner
*Attorney, Agent, or Firm*—Newton, Hopkins & Ormsby

[57] ABSTRACT

Heat is transferred from a first body to a second body and thereby provides power by carrying a thermodynamic fluid comprising a dispersion of a particulate solid in a gas around a thermodynamic cycle or cycles involving the expansion and contraction of the said thermodynamic fluid. Reverse cycles are used to provide refrigeration.

9 Claims, 1 Drawing Figure

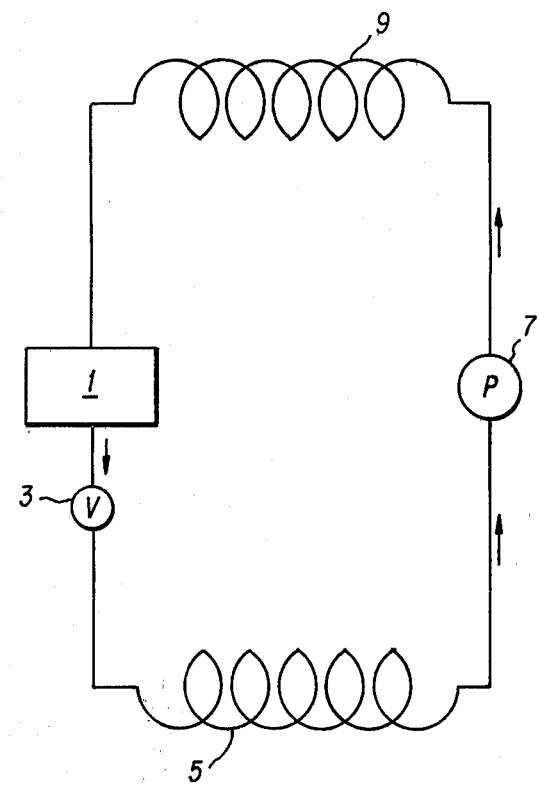

METHOD FOR UTILIZING GAS-SOLID DISPERSIONS IN THERMODYNAMIC CYCLES FOR POWER GENERATION AND REFRIGERATION

BACKGROUND OF THE INVENTION

1. Field of the Invention

The present invention relates to a method of transferring heat from one body to a second body. More particularly, the invention relates to a heat transfer device which employs a thermodynamic fluid for effecting heat transfer by expansion and compression of the thermodynamic fluid.

2. Description of the Prior Art

The basic principles of heat transfer in such systems as heat pumps and refrigerators is well known in which a thermodynamic fluid in a first body is allowed to expand by absorption of heat from the body followed by transfer of the expanded thermodynamic fluid to a second body where the expanded gas is compressed thereby liberating heat to the second body. A variety of gas or vaporous substances have been used as thermodynamic fluids in such heat transfer devices such as fluorocarbon based materials, ammonia, carbon dioxide and the like. While those thermodynamic fluids which are gas phase substances are usable over a wide range of temperature and pressure, they are generally less efficient and more awkward to practically operate than vapor phase thermodynamic fluids. On the other hand, thermodynamic fluids which are vapor phase substances are limited to rather narrow physical operating conditions and it is necessary to use different vapor materials, if in fact they can be obtained, for different and varying operating systems. A need therefore exists for a thermodynamic fluid which exhibits enhanced efficiency and/or more favorable operating characteristics in heat energies, heat pumps and refrigeration cycles.

A special type of heat transfer system, which has been commonly utilized in refrigeration systems, is one which utilizes the heat transfer effect achieved by the desorption of a gaseous substance such as hydrogen from a solid absorbent which requires heat in one body and absorption of the gas onto another sorbing solid in a second body which liberates heat. In such a system, the solid sorbents remain in their respective chambers while the desorbed gas is the working thermodynamic fluid. Van Mal et al in U.S. Pat. No. 4,111,002 show a cyclic desorption refrigerator and heat pump system which is based upon two thermodynamic units each of which is provided with two chambers each containing a solid metal alloy for the absorption of hydrogen, which is the working thermodynamic gas. Prost et al in U.S. Pat. No. 3,704,600 show a cryogenic refrigerator which is based upon hydrogen as the working thermodynamic gas. The device contains two working chambers each of which contains a metal alloy which absorbs hydrogen. Heat is transferred in the device by heating the solid in one chamber thereby desorbing hydrogen from the same and creating a high pressure hydrogen gas which flows through counter flow heatexchangers and is throttled. The cooled throttled gas flows through the place to be cooled and then is eventually absorbed in the other cooled working chamber. Other prior art references which disclose heat transfer systems based upon the desorption and absorption of a working thermodynamic gas are U.S. Pat. Nos. 3,397,549 and 3,854,301.

SUMMARY OF THE INVENTION

One object of the present invention is to provide a thermodynamic fluid of improved heat transfer efficiency which exhibits a greater degree of adaptability to different heat transfer systems.

Another object of the present invention is to provide a method of transferring heat with improved efficiency.

Briefly, these objects and other objects as hereinafter will become more readily apparent can be attained by a method of transferring heat from a first body to a second body comprising:

absorbing heat from said first body by allowing a thermodynamic fluid comprising a dispersion of a particulate solid in a gas to expand;

transferring said expanded thermodynamic fluid to said second body; and compressing said expanded thermodynamic fluid thereby releasing said heat into said second body.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein the FIGURE is a sketch showing the basic components of the heat transfer device of the present invention.

DETAILED DESCRIPTION OF THE PREFERRED EMBODIMENTS

The central feature of the present invention is the formulation of a thermodynamic fluid which is based upon the dispersion of a finely divided particulate solid in a gas. The dispersion or dust exhibits properties which make it useful in conventional heat transfer applications because of the nature of gas-solid intermolecular interactions. This interaction is dependent upon the polarizability, the dipole moment and other moments of the electronic charge distribution of the gaseous component of the dispersion, while, on the other hand, the crystalline structure, porosity and the topological nature of the solid are important factors which influence the properties of the resulting dispersion. When the thermodynamic fluid of the invention is being used, the gas-solid dispersion, over the pressure and temperature ranges utilized must exhibit the phenomenon of gas sorption on the dispersed solid at lower temperatures and/or higher pressures and desorption of the gas from the dispersed solid at higher temperatures and/or lower pressures. In adsorption of the gas by the solid the density of the gas phase is increased in the vicinity of the solid particles. During sorption some of the gas the adsorbate or sorbate) is effectively removed from the gas phase because of the attractive interaction experienced by the gas molecules for the solid component of the dispersion (adsorbent or sorbent). The magnitude of the effect will be enhanced in those systems in which greater amounts of gas can be taken up or sorbed by the solid. Accordingly, in formulating a specific thermodynamic fluid it is only necessary for the skilled artisan to combine a gas component and a solid component and determine if it exhibits the heat transfer properties for a given system operating under certain conditions.

In the formulation of the thermodynamic fluid of the present invention, any finely divided solid that can be dispersed in a gas to form a gas-solid fluid is potentially useful. The nature and magnitude of the heat transfer properties of the dispersion will depend on the material chosen, the particle size, surface structure, internal pore structure and specific surface area of the solid constituent. Suitable materials from which the thermodynamic fluid can be formulated include the likes of metals and metal alloys which are capable of sorbing hydrogen, carbon powders of various porosities, powdered crystalline aluminosilicates, silica, alumina, talc and various clays. In the preparation of the present thermodynamic fluid the particular solid need only be of a size sufficient to form a dispersion in the gas phase component selected. Generally, the particulate solid is of a size ranging from 0.1 to 100 $\mu$m. Moreover, the density of the particulate solid, although not critical, is within the range of 0.1 to 10 gram/cm$^3$.

The gas component of the present thermodynamic fluid is potentially any gaseous substance which will form a particulate dispersion with the solid phase component and which will effectively interact with the particulate solid. Suitable gaseous substances which can be utilized in the formulation of a thermodynamic fluid include the likes of nitrogen, oxygen, air, inert gases such as argon, neon and helium, hydrogen, carbon dioxide, carbon monoxide and light hydrocarbons such as methane, ethane, propane and the like. Useful gaseous substances also include the vapors of substances that are normally a liquid at 25° C. and one atmosphere pressure such as water, many hydrocarbons and products derived from petroleum.

In the preparation of a given thermodynamic fluid composition, the amount of particulate solid combined with the gas component need only be the amounts of substances which provide a workable fluid. Normally, a useful loading range involves the incorporation of about 0.1 to 10 grams of particulate solid per liter of gas, with the mass ratio of particulate solid to gas component ranging from 0.005 to 5.

The ranges of temperature and pressure which constitute a suitable regime in which the present thermodynamic fluid can be employed depends on the selection of particular gaseous and solid components. The gas-solid dispersion can be used over any temperature and pressure ranges for which the particulate solid can be dispersed in the gas phase and the resultant mixture cycled through a power generation, cooling or heating device. The present thermodynamic fluid can be used over temperatures ranging from 10° to 1300° K. and pressures ranging from 0.01 to 100 atmospheres. Normally, a thermodynamic fluid is formulated on the basis of what specific application the fluid is to be used in for heating, cooling or power generation. Each application has its own temperature and pressure requirements and the thermodynamic fluid employed will be designed to meet these requirements. In some instances, in fact, suitable thermodynamic fluids can be formulated from mixtures of two or more gases in combination with mixtures of two or more particulate solids. A prediction of the properties of the gas(es) and solid(s) employed can be achieved from a knowledge of the gas-solid interaction encompassed by the gas-solid virial equation of state.

A unique embodiment of the thermodynamic fluid of the present invention is one in which the fluid composition is formulated from a vaporous substance and a particulate solid. Generally, gas phase cycles are usable over a wide range of temperature and pressure but are less efficient than vapor phase cycles. Vapor phase systems are limited to narrow physical conditions and it is necessary to use different vapor systems, if they can be found, for varying conditions. A vapor-solid fluid will be more efficient (have larger cooling and warming effects) than a gas phase cycle. On the other hand, because of the many possible combinations of gas-solid mixtures in a gas phase cycle, it is possible to design fluids for use over a desired temperature and/or pressure ranges and thus overcome the narrow limits imposed on fluids by the use of vapor component containing systems. The present medium combines efficiency and broad applicability in a way that is not currently available in conventional thermodynamic fluids.

The unique thermal properties of the present gas-solid dispersed thermodynamic fluid is based upon the adsorption and/or sorption of gases by the solid. The system behaves, on the one hand, in a manner similar to a gaseous system in that no abrupt phase transformation takes place and, on the other hand, in a manner similar to the liquid vapor system in that the magnitude of the gas-solid interaction gives rise to an enthalpy change on the order of the heat of vaporization of a liquid. By varying the physical characteristic of the solid and the gas species, optimal thermal properties for a given thermodynamic cycle can be obtained.

As mentioned above the thermodynamic fluid of the present invention can be used in place of the heat transfer fluid in a variety of conventional heat transfer devices such as refrigerators or heat pumps or in devices which generate power by the transfer of heat. Normally, in a power generation system, the thermodynamic fluid is carried around a cycle in which heat is absorbed from a high temperature reservoir, produces and stores work in a work reservoir and expels heat to a low temperature reservoir, the working fluid thereby returning to its initial thermodynamic state. A heat pump operates in the reverse fashion.

A typical heat transfer device of the present invention can be better appreciated by reference to the FIGURE in the application. The FIGURE shows an arrangement in which the thermodynamic fluid of the present invention is generated in a particle cloud generator 1. The particle cloud generator 1 can be any conventional particle cloud generator which can have storage capacity for the gas and solid components of the thermodynamic fluid. Optionally, if desired, a given heat transfer system can contain a separate reservoir for the storage of the components of the fluid. The thermodynamic fluid is allowed to expand through valve 3 into evaporator section 5 where the thermodynamic fluid absorbs heat from the environs of the evaporator. The expanded thermodynamic fluid then flows to condenser 9 where it releases its heat to the environs of the condenser by the work done on the fluid by pump 7 (compression).

Other heat transfer devices would be used for other power or refrigeration processes.

Having now fully described the invention, it will be apparent to one of ordinary skill in the art that many changes and modifications can be made thereto without departing from the spirit or scope of the invention as set forth herein.

What is claimed:

1. A method of transferring heat from a first body to a second body comprising:

absorbing heat from said first body by allowing a thermodynamic fluid comprising a dispersion of a particulate solid in a gas to expand;

transferring said expanded thermodynamic fluid to said second body; and compressing said expanded thermodynamic fluid thereby releasing said heat into said second body, said gas-solid dispersion over the pressure and temperature ranges utilized exhibiting gas sorption on the dispersed solid at lower temperatures, higher pressures, or combinations thereof and desorption of said gas from the dispersed solid at higher temperatures, lower pressures, or combinations thereof.

2. The method of claim 1, wherein said thermodynamic fluid is a particulate dispersion of a solid selected from the group consisting of particulate metals and alloys capable of sorbing hydrogen, porous carbon powder, crystalline aluminosilicates, alumina, silica, talc and clays in a gas selected from the group consisting of an inert gas, oxygen, nitrogen, air, a gaseous hydrocarbon, hydrogen and carbon monoxide.

3. The method of claim 1, wherein said particulate solid has a particle size range of 0.1 to 100 $\mu$m.

4. The method of claim 1, wherein the density of said particulate solid is in the range of 0.1 to 10 g/cm$^3$.

5. The method of claim 1, wherein the mass ratio of said particulate solid in said gas component ranges from 0.005 to 5.

6. The method of claim 1, wherein the density of said particulate solid is in the range of 0.1 to 10 gram/cm$^3$.

7. The method of claim 1, wherein the temperature to which said thermodynamic fluid is subjected to in transferring heat ranges from 10° to 1300° K.

8. The method of claim 1, wherein the pressure to which said thermodynamic fluid is subjected to in transferring heat ranges from 0.1 to 100 atmosphere.

9. An apparatus for the transfer of heat from a first body to a second body, which comprises:

a particle cloud generator for generating a thermodynamic fluid of a dispersion of solid particles in a gas, said dispersion over the pressure and temperature ranges utilized in said apparatus exhibiting gas sorption on the dispersed solid at lower temperatures, higher pressures or combinations thereof and desorption of said gas from the dispersed solid at higher temperatures, lower pressures, or combinations thereof;

an evaporator through which said thermodynamic fluid passes thereby withdrawing heat from said first body;

a condensor through which said heat laden thermodynamic fluid passes and in which said thermodynamic fluid releases its heat to said second body; and a pump for compressing said thermodynamic fluid so that said fluid releases its heat in said condensor.

* * * * *